US010535869B2

(12) United States Patent
Kim et al.

(10) Patent No.: US 10,535,869 B2
(45) Date of Patent: Jan. 14, 2020

(54) POSITIVE ACTIVE MATERIAL, LITHIUM BATTERY INCLUDING THE SAME, AND METHOD OF MANUFACTURING THE POSITIVE ACTIVE MATERIAL

(71) Applicant: Samsung SDI Co., Ltd., Yongin-si, Gyeonggi-do (KR)

(72) Inventors: Young-Ki Kim, Yongin-si (KR); Young-Hun Lee, Yongin-si (KR); Ick-Kyu Choi, Yongin-si (KR); Yong-Chul Park, Yongin-si (KR); Soon-Rewl Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1021 days.

(21) Appl. No.: 14/452,412

(22) Filed: Aug. 5, 2014

(65) Prior Publication Data

US 2015/0214543 A1      Jul. 30, 2015

(30) Foreign Application Priority Data

Jan. 27, 2014    (KR) .................. 10-2014-0009935

(51) Int. Cl.
  *H01M 4/36*   (2006.01)
  *H01M 4/485*  (2010.01)
  (Continued)

(52) U.S. Cl.
  CPC ............ *H01M 4/366* (2013.01); *C01G 39/00* (2013.01); *H01M 4/36* (2013.01); *H01M 4/485* (2013.01);
  (Continued)

(58) Field of Classification Search
  CPC ......... H01M 10/052; H01M 2004/021; H01M 4/1391; H01M 4/505; H01M 4/525;
  (Continued)

(56) References Cited

U.S. PATENT DOCUMENTS 6,346,348 B1      2/2002   Nakajima et al.
2007/0292763 A1  12/2007   Park et al.
(Continued)

FOREIGN PATENT DOCUMENTS

| JP | 3670875 B2 | 4/2005 | |
|----|------------|--------|---|
| JP | 2009-16245 A | 1/2009 | |
| JP | WO 2012121220 A1 * | 9/2012 | ......... C01G 45/1228 |

OTHER PUBLICATIONS

Machine Translation of WO 2012121220 A1, Tsunozaki et al., extracted on Dec. 14, 2016.*

*Primary Examiner* — Miriam Stagg
*Assistant Examiner* — Abibatu O Ojo-Amoo
(74) *Attorney, Agent, or Firm* — Knobbe, Martens, Olson & Bear LLP

(57) ABSTRACT

Provided are a positive active material, a lithium battery including the positive active material, and a method of manufacturing the positive active material. The positive active material includes a lithium molybdate composite having a core-shell structure. The lithium molybdate composite acts as a sacrificial positive electrode in a positive electrode of a battery. The positive active material is able to increase charge capacity of a lithium battery, and accordingly is able to improve lifetime properties of a lithium battery.

17 Claims, 10 Drawing Sheets

(51) Int. Cl.
*H01M 4/58* (2010.01)
*H01M 10/052* (2010.01)
*C01G 39/00* (2006.01)
*H01M 4/525* (2010.01)
*H01M 4/505* (2010.01)
*H01M 4/1391* (2010.01)
*H01M 4/02* (2006.01)

(52) U.S. Cl.
CPC ........... *H01M 4/505* (2013.01); *H01M 4/525* (2013.01); *H01M 4/58* (2013.01); *H01M 10/052* (2013.01); *H01M 4/1391* (2013.01); *H01M 2004/021* (2013.01)

(58) Field of Classification Search
CPC ........ H01M 4/36; H01M 4/366; H01M 4/485; H01M 4/58; C01G 39/00
USPC ........................................................ 429/221
See application file for complete search history.

(56) References Cited

U.S. PATENT DOCUMENTS

| 2009/0011333 | A1 | 1/2009 | Wakita et al. |
| 2010/0143799 | A1* | 6/2010 | Park ..................... H01M 4/485 |
| | | | 429/219 |

* cited by examiner

POSITIVE ACTIVE MATERIAL, LITHIUM BATTERY INCLUDING THE SAME, AND METHOD OF MANUFACTURING THE POSITIVE ACTIVE MATERIAL

CROSS-REFERENCE TO RELATED APPLICATION

This application claims the benefit of Korean Patent Application No. 10-2014-0009935, filed on Jan. 27, 2014, the disclosure of which is incorporated herein in its entirety by reference.

BACKGROUND

Field

One or more embodiments relate to a positive active material, a lithium battery including the positive active material, and a method of manufacturing the positive active material.

Description of the Related Art

A lithium secondary battery uses an organic electrolyte aqueous solution, and accordingly has high discharge voltage that is at least two times as large as that of a conventional battery using an alkali aqueous solution. Thus, the lithium secondary battery has high energy density.

The lithium secondary battery includes a material capable of intercalating and deintercalating lithium ions, as an active material for negative and positive electrodes. In addition, the lithium secondary battery is manufacturing by charging an organic electrolyte aqueous solution or a polymer electrolyte aqueous solution, which is interposed between the positive electrode and the negative electrode. The lithium secondary battery manufactured thereby generates electrical energy by oxidation and reduction occurring when lithium ions are intercalated and deintercalated at the positive and negative electrodes.

As a positive active material for the lithium secondary battery, $LiCoO_2$ is currently the most widely used. However, a manufacturing cost of $LiCoO_2$ is expensive, and a stable supply of $LiCoO_2$ is not guaranteed. Therefore, as an alternative to such a positive active material, a composite material formed in a combination with nickel (Ni) or manganese (Mn) is being developed.

In the case of a Ni-based oxide composite, in order to increase capacity per unit volume of the Ni-based oxide composite, an amount of Ni of the Ni-based oxide composite may be increased, or a mixture density of the electrode active material may be increased. However, a positive active material that may increase a packing density and satisfy thermal stability and capacity properties at the same time is still needed.

SUMMARY

One or more embodiments include a positive active material that has improved capacity and lifetime properties.

One or more embodiments include a lithium battery including the positive active material.

One or more embodiments include a method of manufacturing the positive active material.

Additional aspects will be set forth in part in the description which follows and, in part, will be apparent from the description, or may be learned by practice of the presented embodiments.

According to one or more embodiments, a positive active material includes:

a lithium molybdate composite having a core-shell structure, wherein the core includes lithium molybdate having a first peak at a diffraction angle (2θ) of 20.65±0.1° and a second peak at a diffraction angle (2θ) of 30.50±0.1°, in an X-ray diffraction (XRD) measurement using a CuKα ray, and the shell includes an amorphous coating layer containing Li-M-O—C(wherein M is at least one metal selected from sodium (Na), potassium (K), cesium (Cs), magnesium (Mg), calcium (Ca), strontium (Sr), barium (Ba), yttrium (Y), lanthanum (La), titanium (Ti), zirconium (Zr), vanadium (V), manganese (Mn), iron (Fe), copper (Co), nickel (Ni), silver (Ag), gold (Au), zinc (Zn), and aluminum (Al)).

According to one or more embodiments, a method of manufacturing a positive active material includes:

preparing a lithium molybdenum oxide represented by Formula 2 below;

performing a first heat treatment to the lithium molybdenum oxide at a temperature from about 500° C. to about 1,100° C. in a reducing atmosphere; and adding a source of transition metal M (wherein M is at least one metal selected from Na, K, Cs, Mg, Ca, Sr, Ba, Y, La, Ti, Zr, V, Mn, Fe, Co, Ni, Ag, Au, Zn, and Al) to the lithium molybdenum oxide to obtain a mixture, followed by performing a second heat treatment to the mixture at a temperature from about 500° C. to about 1,300° C. in a reducing atmosphere;

[Formula 2]

wherein 1<x≤3

According to one or more embodiments, a lithium battery including:

a positive electrode including the positive active material;

a negative electrode disposed opposite to the positive electrode; and an electrolyte interposed between the positive electrode and the negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE PREFERRED EMBODIMENT

Figure 1:
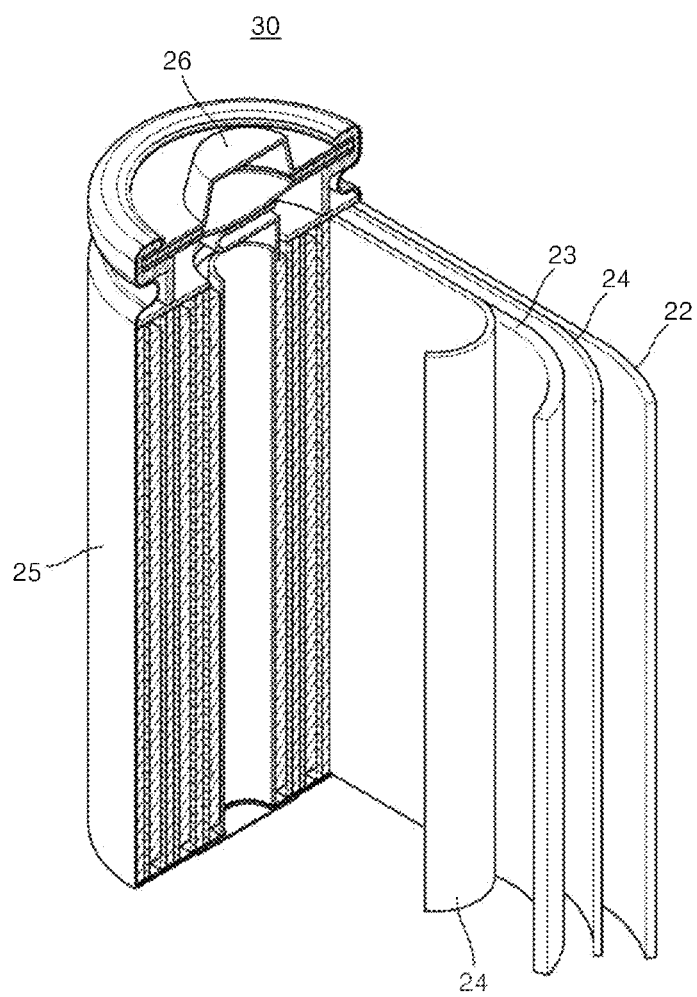
FIG. 1 is a schematic view illustrating a lithium battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, the present embodiments will be described in detail.

A positive active material according to an aspect includes a lithium molybdate composite having a core-shell structure.

The lithium molybdate composite may act as a sacrificial positive electrode in the process of charging and discharging a lithium battery. The term "sacrificial positive electrode" refers to the concept that during the charging of a lithium battery, lithium ions that have lost electrons in a positive active material migrate from a positive electrode to a negative electrode through an electrolyte, and the lithium ions are stored between layers of a negative active material. Then, during the discharge of the lithium battery, the lithium ions reversibly migrate from the negative electrode to the positive electrode through the electrolyte. Here, some of the lithium ions that are initially released from the positive electrode remain in the layers of the negative active material. Thus, less than 100% of the lithium ions are returned to the positive electrode. In this regard, the amount of the lithium ions remaining in the negative electrode may cause reduction in capacity of the lithium battery. Thus, additional positive active materials are added thereto to compensate for such reduction, and these positive active materials are referred to as the sacrificial positive electrodes. Active materials of the same or different kind with a positive active material that is generally used for a positive electrode may be further combined to prepare the sacrificial positive electrode.

The lithium molybdate composite may act as the sacrificial positive electrode, and accordingly may be involved in electrochemical properties of the lithium battery during a formation process only. The capacity of the lithium molybdate composite is at least about 250 mAh/g when the lithium molybdate composite is actually included in a battery. That is, the lithium molybdate composite has a great capacity compared to that of the existing positive active materials, such as lithium cobalt oxide (LCO), lithium manganese oxide (LMO), lithium cobalt manganese (NCM), nickel cobalt aluminum (NCA), and lithium iron phosphate (LiFePo$_4$), when these existing positive active materials are actually included in a battery. In addition, the lithium molybdate composite may be used to compensate for irreversibility of a negative electrode.

The positive active material according an embodiment includes a lithium molybdate that has a core-shell structure, wherein the core includes lithium molybdate having a crystalline structure, and the shell includes an amorphous coating layer containing Li-M-O—C (wherein M is at least one metal selected from sodium (Na), potassium (K), cesium (Cs), magnesium (Mg), calcium (Ca), strontium (Sr), barium (Ba), yttrium (Y), lanthanum (La), titanium (Ti), zirconium (Zr), vanadium (V), manganese (Mn), iron (Fe), cobalt (Co), nickel (Ni), silver (Ag), gold (Au), zinc (Zn), and aluminum (Al)).

The lithium molybdate included in the core may be an oxide containing Li—Mo—O, and for example, may be represented by Formula 1 below:

$$Li_xMo_yO_z$$ [Formula 1]

wherein $0<x\leq6$, $1\leq y\leq5$, and $2\leq z\leq17$.

In Formula 1 above, x is a stoichiometric amount of lithium, and the amount may be determined to be in a sufficient range to release lithium ions during the formation process, according to types of a negative active material. In Formula 1 above, y and z may vary according to a crystal structure of the lithium molybdate.

In some embodiments, in Formula 1 above, the amount of Li may be from about 1.95 mol to about 2.05 mol based on 1 mol of molybdenum (Mo).

The lithium molybdate may have a crystal structure that is different from that of conventional lithium molybdate. Then, such a different crystal structure may be confirmed by X-ray diffraction (XRD) patterns.

According to an embodiment, in XRD patterns using a CuKα ray, the core of the lithium molybdate composite may include lithium molybdate having a first peak at a diffraction angle (2θ) of 20.65±0.1° and a second peak at a diffraction angle (2θ) of 30.50±0.1°. The first and second peaks are new peaks that are not found yet in other lithium molybdates of the related art. In this regard, the lithium molybdate of the core may form a new phase that is different from that of the related art. Thus, it is deemed that the positive active material may have electrochemical properties that are different from those of existing positive active material of the art.

Regarding the XRD pattern of the lithium molybdate in a greater detail, a full wide at half maximum of the first peak (FWHM1) may be from about 0.05° to about 2°, and a full wide at half maximum of the second peak (FWHM2) may be from about 0.05° to about 1°.

In addition, in the XRD patterns, the lithium molybdate may further have a third peak at a diffraction angle (2θ) of 17.90±0.1°, and a peak intensity ratio of the first peak to the third peak ($I_1/I_3$) may be from about 0.01 to about 0.1. Moreover, the lithium molybdate may have a fourth peak at a diffraction angle (2θ) of 36.5±0.1° and a fifth peak at a diffraction angle (2θ) of 43.65±0.1°.

The lithium molybdate having such XRD patterns may be, for example, $Li_2MoO_3$, disordered $Li_2MoO_3$, $Li_4MoO_5$, $Li_{0.98}MoO_2$, or a combination thereof. Here, the stoichiometric amount x of lithium may be added or subtracted within a range of ±0.1. Here, examples of the lithium molybdate are not limited thereto.

The shell that includes the amorphous coating layer containing Li-M-O—C may be disposed on the core that includes the lithium molybdate. Here, M may be at least one metal selected from Na, K, Cs, Mg, Ca, Sr, Ba, Y, La, Ti, Zr, V, Mn, Fe, Co, Ni, Ag, Au, Zn, and Al. All or a portion of the core surface may be coated with the amorphous coating layer. The Li amorphous coating layer containing Li-M-O—C may have improved elution issues caused by the lithium molybdate of the core, and accordingly the capacity of the battery may have been improved.

According to an embodiment, the amorphous coating layer is in a form that lithium is relatively uniformly distributed and particles of the metal M are partially present in a film which mainly contains amorphous carbon.

The amorphous coating layer may have a Li-rich Li-M-O—C composition, and Li contained therein may be derived from the lithium molybdate included in the core. In some embodiments, the amorphous coating layer may contain Li in a larger amount than that of Li distributed in the core, and such a large amount of Li may be uniformly or non-uniformly distributed in the amorphous coating layer. For example, an amount of Li contained in the amorphous coating layer may be from about 1.0025 mol to about 1.15 mol based on 1 mol of the lithium molybdate included in the core.

The amorphous coating layer may have a thickness of 100 nm or less. For example, the thickness of the amorphous coating layer may be about 50 nm, about 20 nm, or about 10 nm or less.

In some embodiments, the lithium molybdate composite may further include a N-containing lithium molybdate intermediate layer disposed between the core and the shell. The N-containing lithium molybdate intermediate layer may have a predetermined thickness inside the outermost of the core, the outermost of the core being in contact with the shell.

The N-containing lithium molybdate intermediate layer may be formed by, for example, an influx of nitrogen components of nitroxides during the process of manufacturing the positive active material, when nitrate are used as a source of the transition metal element M for the shell. Alternatively, the N-containing lithium molybdate intermediate layer may be formed by an influx of nitrogen components that form a reducing atmosphere during the process of heat treatment in a reducing atmosphere.

The lithium molybdate composite may have an average particular diameter of about 30 µm or less, for example, from about 1 µm to about 30 µm, about 2 µm to about 20 µm, or about 5 µm to about 20 µm. The average particle diameter used herein refers to particle size distribution D50, which is the value of the particle diameter at 50% by volume in the cumulative distribution curve if the total volume of the particles is considered to be 100%, cumulative average particle size. D50 may be measured by a method widely known in the art, and for example, D50 may be measured using a particle size analyzer, or by transmission electron microscopy (TEM) imaging or scanning electron microscopy (SEM) imaging. Moreover, D50 may be easily measured by analyzing data measured by a measuring device which uses a dynamic light-scattering method to count the number of particles that correspond to each particle size range. Then, the counted number is calculated so as to obtain the average particle diameter.

The lithium molybdate composite may act as a sacrificial positive electrode during the formation process. Thus, the positive active material may further include a compound that is capable of being involved in electrochemical properties during charging and discharging of a battery following the formation process, and that is capable of reversibly intercalating and deintercalating lithium.

The compound that is capable of reversibly intercalating and deintercalating lithium may be any one of various materials that are used as a lithium transition metal oxide for a lithium battery in the art. For example, the compound may be represented by at least one formula selected from $Li_aA_{1-b}B_bD_2$ (wherein $0.90 \leq a \leq 1$, and $0 < b \leq 0.5$); $Li_aE_{1-b}B_bO_{2-c}D_c$ (wherein $0.90 \leq a \leq 1$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aN_{1-b-c}Co_bB_cD_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$ and $0.001 \leq b \leq 0.1$.); $Li_aCoG_bO_2$ (wherein $0.90 \leq a \leq 1$ and $0.001 \leq b \leq 0.1$.); $Li_aMnG_bO_2$ (wherein $0.90 \leq a \leq 1$ and $0.001 \leq b \leq 0.1$); $Li_aMn_2G_bO_4$ (wherein $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); or $LiFePO_4$, but the compound is not limited thereto.

In formulae above, A may be selected from group consisting Ni, Co, manganese (Mn), or a combination thereof; X may be selected from the group consisting of Al, Ni, Co, Mn, chromium (Cr), iron (Fe), magnesium (Mg), strontium (Sr), V, a rare earth element, or a combination thereof; D may be selected from group consisting of oxygen (O), fluorine (F), sulfur (S), phosphate (P), or a combination thereof; E may be selected from group consisting of Co, Mn, or a combination thereof; T may be selected from group consisting of F, S, P, or a combination thereof; G may be selected from group consisting of Al, Cr, Mn, Fe, Mg, La, cerium (Ce), Sr, V, or a combination thereof; Q may be selected from group consisting of Ti, molybdenum (Mo), Mn, or a combination thereof; Z may be selected from group consisting of Cr, V, Fe, scandium (Sc), Y, or a combination thereof; and J may be selected from group consisting of V, Cr, Mn, Co, Ni, copper (Cu), or a combination thereof.

The amounts of the lithium transition metal oxide composite and the lithium molybdate composite are not particularly limited, and may be suitably adjusted within a range that indicates electrochemical properties of a battery without causing degradation of the charge capacity of a battery. For example, the lithium transition metal oxide composite and the lithium molybdate composite may be mixed at a weight ratio from about 50:50 to about 99:1. In detail, the weight ratio of the lithium transition metal oxide composite to the lithium molybdate composite may be from about 97.5:2.5 to about 70:30, for example, about 95:5 to about 80:20.

A method of manufacturing the positive active material according to another aspect includes:

preparing a lithium molybdenum oxide represented by Formula 2 below;

performing a first heat treatment to the lithium molybdenum oxide at a temperature from about 500° C. to about 1,100° C. in a reducing atmosphere; and adding a source of transition metal element M (wherein M is at least one metal selected from Na, K, Cs, Mg, Ca, Sr, Ba, Y, La, Ti, Zr, V, Mn, Fe, Co, Ni, Ag, Au, Zn, and Al) to the lithium molybdenum oxide to obtain a mixture, followed by performing a second heat treatment to the mixture at a temperature from about 500° C. to about 1,300° C. in a reducing atmosphere;

   [Formula 2]

wherein 1<x≤3

For example, a lithium source and a molybdenum source are mixed at a predetermined molar ratio, and the mixture is heat-treated at a temperature from about 400° C. to about 750° C., thereby obtaining the lithium molybdenum oxide of Formula 2 above.

Here, the lithium source is not particularly limited, and examples thereof include lithium carbonate, lithium nitrate, lithium oxide, lithium hydroxide, or lithium halide. The molybdenum source is not particularly limited, and examples thereof include molybdenum oxide, molybdenum nitrate, molybdenum carbonate, molybdenum halide, or molybdenum sulfide.

The lithium source and the molybdenum source are used in an amount that is sufficient enough to manufacture the lithium molybdenum oxide of Formula 2. For example, the lithium source and the molybdenum source, e.g., $Li_2CO_3$ and $MoO_3$, may be mixed at a predetermined ratio.

The heat treatment may be performed to the mixture at a temperature from about 400° C. to about 750° C. for 3 to 8 hours. The lithium molybdenum oxide obtained therefrom may have $Li_xMoO_3$ composition of Formula 2. For example, the lithium molybdenum oxide may have $Li_{1.95}MoO_3$ or $Li_{2.05}MoO_3$ composition.

Next, the lithium molybdenum oxide is subjected to the first heat treatment.

The first heat treatment may be performed at a temperature from about 500° C. to about 1,100° C. in a reducing atmosphere. A phase may be suitably formed under the heat treatment conditions described above. The reducing atmosphere used herein may contain, for example, nitrogen as a main component and hydrogen from about 0 volume % to about 10 volume %. In detail, the first heat treatment may be performed in a reducing atmosphere consisting of 95 volume % of nitrogen and 5 volume % of hydrogen. The time for performing the first heat treatment may vary according to the heat treatment temperature. For example, the heat treatment may be performed for about 2 to about 15 hours.

In some embodiments, the first heat treatment may be performed at a temperature of about 700° C. for 10 hours in a nitrogen atmosphere.

Then, in order to form a coating layer on a surface of a resultant product obtained by the first heat treatment, a source of transition metal element M (wherein M is at least one metal selected from Na, K, Cs, Mg, Ca, Sr, Ba, Y, La, Ti, Zr, V, Mn, Fe, Co, Ni, Ag, Au, Zn, and Al) is added to the resultant product, and then, the mixture is subjected to the second heat treatment at a temperature from about 500° C. to about 1,300° C. in a reducing atmosphere.

Examples of the source of transition element M include carbonates, nitrates, or oxides.

The second heat treatment may be performed at a temperature from about 500° C. to about 1,300° C. in a reducing atmosphere. When the heat treatment is performed at a temperature within the above ranges, the amorphous coating layer containing Li-M-O—C may be formed. Here, the second heat treatment is performed at temperature that is higher than that of the first heat treatment so as to form the core-shell structure of the positive active material.

The time for performing the second heat treatment time may vary according to the heat treatment temperature. For example, the second heat treatment may be performed for about 2 to about 15 hours.

For example, the second heat treatment may be performed at a temperature of about 1,000° C. for 10 hours in a nitrogen atmosphere.

A resultant product obtained according to the mixing and heat-treating processes above may be pulverized so as to obtain a lithium molybdate composite having an average particle diameter from about 5 μm to about 10 μm.

The lithium molybdate composite obtained thereby may be mixed with the lithium transition metal oxide composite at a predetermined ratio so as to manufacture a positive electrode.

A lithium battery according to another aspect may include a positive electrode including the positive active material; a negative electrode disposed opposite the positive electrode; and an electrolyte interposed between the positive electrode and the negative electrode.

The positive electrode may include the above-described positive active material, and may be, for example, manufactured by preparing a positive active material composition by mixing the above-described positive active material, a conductive agent, and a binder, with a solvent. Thereafter, the positive active material composition may be molded in a certain shape, or a copper foil current collector or the like may be coated with the positive active material composition.

The conductive agent used in the positive active material composition may be a material to improve electrical conductivity of the positive active material by providing a conductive pathway thereto. The conductive agent may be any one of various materials that are used as a conductive agent for a lithium battery in the art. For example, the conductive agent may be a carbonaceous material, such as carbon black, acetylene black, ketjen black, or carbon fiber (e.g., vapor phase grown carbon fiber); a metallic material, such as metal powder or metal fiber, of copper, nickel, aluminum, or silver; a conductive polymer such as a polyphenylene derivative; or a combination thereof. An amount of the conductive agent may be suitably adjusted. For example, the positive active material and the conductive agent may be added at a weight ratio from about 99:1 to about 90:10.

The binder used in the positive active material composition may be a component to assist binding between the positive active material and the conductive agent, or between the positive active material and the current collector. The amount of the binder may range from about 1 to about 50 parts by weight based on 100 parts by weight of the positive active material. For example, the amount of the binder may range from about 1 to about 30 parts by weight, about 1 to about 20 parts by weight, or about 1 to about 15 parts by weight, based on 100 parts by weight of the positive active material. Examples of the binder include polyvinylidene fluoride, polyvinylidene chloride, polybenzimidazol, polyimide, polyvinyl acetate, polyacrylonitrile, polyvinylalcohol, carboxymethylcelulose (CMC), starch, hydroxypropylmethyl cellulose, regenerated cellulose, polyvinyl pyrrolidone, polyethylene, polypropylene, polystyrene, polymethylmethacrylate, polyaniline, acrylonitrile-butadiene-styrene, phenol resin, epoxy resin, polyethyleneterephthalate, polytetrafluorethylene, polyphenyl sulfide, polyamideimide, polyeterimide, polyethylenesulfone, polyamide, polyacetal, polyphenylene oxide, polybutylene terephthalate, ethylene-propylene-dien terpolymer (EPDM), sulfonated EPDM, styrene-butadiene rubber, fluorocarbon rubber, and various copolymers.

Examples of the solvent include N-methylpyrrolidone, acetone, or water. The amount of the binder may range from about 1 to 10 parts by weight based on 100 parts by weight of the positive active material. When the amount of the solvent is within the above range, an active material layer may be easily formed.

The current collector may be typically formed to have a thickness from about 3 μm to about 500 μm. The current collector is not particularly limited as long as the current collector is conductive without causing adverse chemical changes in the manufactured battery. Examples of the current collector include copper, stainless steel, aluminum, nickel, titanium, calcined carbon, a copper surface, or a stainless steel surface-treated with carbon, nickel, titanium, or silver, or aluminum-cadmium alloys. In addition, fine irregularities may be included on the surface of the current collector so as to enhance adhesion of the surface of the current collector to the positive active materials. In addition, the current collector may be used in various forms including films, sheets, foils, nets, porous structures, foams, and non-woven fabrics.

A coating of the formed positive active material composition may be directly applied onto a current collector to prepare a positive plate. Alternatively, the formed positive active material composition may be cast on a separate support, and then, the current collector may be laminated with a positive active material film exfoliated from the support to prepare a positive plate. The positive electrode is not limited to the form described above, and may be in a form other than the above forms.

The positive active material composition may be used for manufacturing the lithium battery, and in addition, may be printed on a flexible electrode substrate to be used for manufacturing a printable battery.

A negative electrode may be manufactured by preparing a negative active material composition by mixing a negative active material, a binder, and selectively a conductive agent, with a solvent.

The negative active material is not particularly limited, and may be any one of various materials that are used as a negative active material for a lithium battery in the art. Non-limiting examples of the negative active material include lithium metal, lithium-alloyable metal, transition metal oxide, a material capable of doping and dedoping lithium, or a material reversibly capable of intercalating and deintercalating lithium ions.

Non-limiting examples of the transition metal oxide include tungsten oxide, molybdenum oxide, titanium oxide, lithium titanium oxide, vanadium oxide, or lithium vanadium oxide.

The material capable of doping and dedoping lithium may be, for example Si, $SiO_x$ (wherein $0<x\leq2$), a Si—Y alloy (wherein Y is an alkali metal, an alkali earth metal, a Group 13 element, a Group 14 element, a transition metal, a rare-earth element, or a combination element thereof, and Y is not Si), Sn, $SnO_2$, or a Sn—Y alloy (wherein Y is an alkali metal, an alkali earth metal, a Group 13 element, a Group 14 element, a transition metal, a rare-earth element, or a combination element thereof, and Y is not Sn). The material capable of doping and dedoping lithium may be prepared by mixing $SiO_2$ with at least one of these examples. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material reversibly capable of intercalating and deintercalating lithium ions may be any one of various materials that are used as a carbonaceous material for a lithium battery in the art. For example, the carbonaceous material may be crystalline carbon, amorphous carbon, or a mixture thereof. Non-limiting examples of the crystalline carbon include natural graphite that is amorphous, tabular, flake-like, circular, or fibrous; or artificial graphite. Non-limiting examples of the amorphous carbon include soft carbon (i.e., low calcined carbon) or hard carbon, mesophase pitch carbide, or calcined cork.

According to an embodiment, the negative active material may use only one type of or a combination of at least two types of silicon-based negative active materials, such as Si, $SiO_x$ (wherein $0<x\leq2$), and a Si—Y alloy.

A binder, a conductive agent, and a solvent used in the negative active material composition may be the same as those used in the positive active material composition. In some embodiments, a plasticizer may be further added to the positive active composition and the negative active material composition to form pores inside an electrode plate. The amounts of the negative active material, the conductive agent, the binder, and the solvent may be typical levels used for a lithium battery of the related art.

The negative current collector may be formed to have a thickness from about 3 μm to about 500 μm. The current collector is not particularly limited as long as the current collector is conductive without causing adverse chemical changes in the manufactured battery. Examples of the current collector include stainless steel, aluminum, nickel, titanium, sintered carbon, an aluminum surface or a stainless steel surface-treated with carbon, nickel, titanium, or silver. In addition, fine irregularities may be included on the surface of the current collector so as to enhance adhesion of the surface of the current collector to the negative electrode active materials.

A coating and drying of the formed negative active material composition may be directly applied onto a negative current collector to prepare a positive plate. Alternatively, the formed negative active material composition may be cast on a separate support, and then, the negative current collector may be laminated with a negative active material film exfoliated from the support to prepare a negative plate.

Then, a separator to be inserted between the positive electrode and the negative electrode may be prepared. The separator may be any one of various separators that are used in a typical lithium battery. For example, a material that has low resistance to ion migration of an electrolyte and has an excellent electrolytic solution retaining capability is suitable for forming the separator. For example, a material for forming the separator may be selected from glass fiber, polyester, Teflon, polyethylene, polypropylene, polytetrafluoroethylene (PTFE), and a combination thereof, each of which may be in a non-woven fabric or woven fabric form. Pores included in the separator may have a diameter from about 0.01 μm to about 10 μm, and the separator may have a thickness from about 5 μm to about 300 μm.

The electrolyte consists of consists of a non-aqueous electrolyte and a lithium salt. The non-aqueous electrolyte may be a non-aqueous electrolytic solution, an organic solid electrolyte, an inorganic solid electrolyte, or the like.

The non-aqueous electrolytic solution may be, for example, an aprotic organic solvent, and examples thereof include N-methyl-2-pyrrolidinone, propylene carbonate, ethylene carbonate, butylenes carbonate, dimethyl carbonate, diethyl carbonate, gamma-butyrolacton, 11,2-dimethoxy ethane, tetrahydrofurane, 2-methyl tetrahydrofurane, dimethylsulfoxide, 1,3-dioxolane, 4-methyldioxolane, formamide, dimethylformamide, dioxolane, acetonitrile, nitromethane, methyl formate, methyl acetate, triester phosphate, trimethoxy methane, dioxolane derivative, sulfolane, methyl sulfolane, 1,3-dimethyl-2-imidazolidinone, propylene carbonate derivative, tetrahydrofurane derivative, ether, methyl propionate, and ethyl propionate.

The organic solid electrolyte may be, for example, polyethylene derivative, polyethylene oxide derivative, polypropylene oxide derivative, phosphate ester polymer, polyagitation lysine, polyester sulfide, polyvinyl alcohol, poly fluoro vinylidene, or ionic decomposer-containing polymer.

The inorganic solid electrolyte may be, for example, nitrides, halids, and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be any one of various lithium salts that are typically used in a lithium battery, and one or more lithium salts that are easily dissolved in the non-aqueous based electrolyte may be used, and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, low aliphatic lithium carbonate, 4 phenyl lithium borate, lithium imide.

The lithium battery may be a lithium ion battery, a lithium ion polymer battery, or a lithium polymer battery, classified according to the types of the separator and the electrolyte being used; a cylindrical battery, a rectangular battery, a coin-shape battery, or a pouch-shape battery, classified according to the shape of the separator and the electrolyte being used; or a bulky battery or a thin-film type battery, classified according to the size of the separator and the electrolyte being used. In addition, the lithium battery may be a lithium primary battery and a lithium secondary battery.

Methods of manufacturing these batteries are widely known in the art, and thus, a detailed description thereof is not described herein.

FIG. 1 is a schematic view illustrating a lithium battery 30 according to an embodiment.

Referring to FIG. 1, the lithium battery 30 includes a positive electrode 23, a negative electrode 22, and a separator 24 interposed between the positive electrode 23 and the negative electrode 22. The positive electrode 23, the negative electrode 22, and the separator 24 are wound or folded to be placed in a battery case 25. Subsequently, an electrolyte is injected into the battery case 25 and the resultant structure is sealed with an encapsulation member 26, thereby completing the manufacturing of the lithium battery 30. The battery case 25 may be cylindrical, rectangular, or thin-film shaped. The lithium battery may be a lithium ion battery.

The lithium battery may be suitable for, in addition to existing mobile phones and portable computers, electric vehicles requiring a high capacity battery, a high-power output, and high temperature operation. Also, the lithium battery may be combined with a typical internal combustion engine, a fuel battery, or a super capacitor for use in hybrid vehicles. In addition, the lithium battery may be suitable for any application requiring a high capacity battery, high voltage, and high-temperature operation.

Embodiments are further described in detail with Examples and Comparative Examples. However, Examples are presented herein for illustrative purposes only.

Manufacturing of Lithium Molybdate Composite

Preparation Example 1: Manufacturing of Lithium Molybdate Composite Having Core-Shell Structure with Co-Containing Shell Lithium carbonate and molybdenum IV oxide, which were used as starting materials, were mixed by adjusting a molar ratio of Li:Mo, so as to obtain mixed powder of $Li_{2.10}MoO_3$ composition. The mixture was subjected to heat treatment at a temperature of 700° C. for 10 hours in a reducing atmosphere, and then, was subjected to cooling. Then, $Li_{2.10}MoO_3$ powder synthesized by the cooling was subjected to heat treatment at a temperature of 1,050° C. for 10 hours in a reducing atmosphere, so as to obtain a lithium molybdate composite having a core-shell structure that contains a LI-rich phase on a Li surface. 100 g of the lithium molybdate composite was mixed with $Co(NO_3)_2$ in a weight ratio by 3 wt %, and the mixture was heat-treated at a temperature of 950° C. for 10 hours in a reducing atmosphere, thereby preparing a lithium molybdate composite having a core-shell structure in which Co was contained in the shell.

Preparation Example 2: Manufacturing of Lithium Molybdate Composite Having Core-Shell Structure with Ti-Containing Shell Lithium carbonate and molybdenum IV oxide, which were used as starting materials, were mixed by adjusting a molar ratio of Li:Mo so as to obtain mixed powder of $Li_{210}MoO_3$ composition. The mixture was subjected to heat treatment at a temperature of 700° C. for 10 hours in a reducing atmosphere, and then, was subjected to cooling. Then, $Li_{2.10}MoO_3$ powder synthesized by the cooling was subjected to heat treatment at a temperature of 1,050° C. for 10 hours in a reducing atmosphere so as to obtain a lithium molybdate composite having a core-shell structure that contains a LI-rich phase on a Li surface. 100 g of the lithium molybdate composite was mixed with titanium isopropoxide in a weight ratio by 3 wt %, and the mixture was heat-treated at a temperature of 950° C. for 10 hours in a reducing atmosphere, thereby preparing a lithium molybdate composite having a core-shell structure in which Ti was contained in the shell.

Comparative Preparation Example 1: Manufacturing of Positive Eactive Material (LI2.00MOO3)

Lithium carbonate and molybdenum IV oxide, which were used as starting materials, were mixed by adjusting a molar ratio of Li:Mo so as to obtain mixed powder of $Li_{2.00}MoO_3$ composition. The mixture was subjected to heat treatment at a temperature of 700° C. for 10 hours in a reducing atmosphere, and then, was subjected to cooling. Then, $Li_{2.00}MoO_3$ powder synthesized by the cooling was subjected to heat treatment at a temperature of 1,050° C. for 10 hours in a reducing atmosphere so as to obtain mixed powder of $Li_{2.00}MoO_3$ composition.

Evaluation Example 1: Sem-Eds Analysis

In order to confirm structural features and distribution of the constituent elements, scanning electron microscopy-energy dispersive X-ray spectrometer (SEM-EDS) analysis was performed on the lithium molybdate composite of Preparation Example 1.

Figure 2:
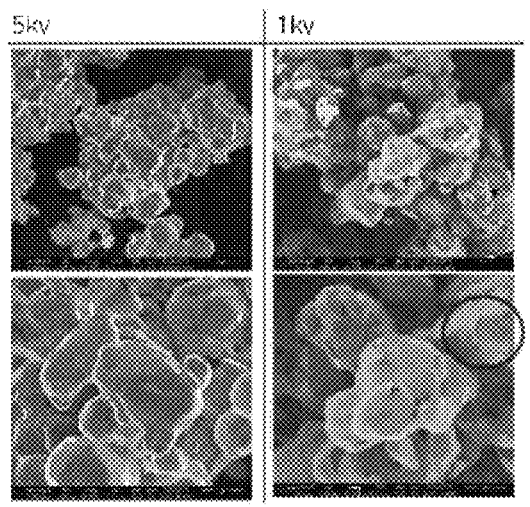
FIG. 2 shows scanning electron microscopy (SEM) images of a lithium molybdate composite of a positive active material manufactured according to Preparation Example 1.

FIG. 2 shows SEM images of the lithium molybdate composite of Preparation Example 1, the images being observed at voltages of 5 kV and 1 kV. Referring to FIG. 2, it was found that the lithium molybdate had a homogenous surface and has formed a membranous layer. When observed with SEM, it was observed that the membranous layer was exfoliated by a beam. When observed with transmission electron microscopy (TEM), the same phenomenon was also observed in the images on the second row in FIG. 2, and the exfoliated layer observed herein was considered as a Co-containing amorphous coating layer.

Figure 3A:
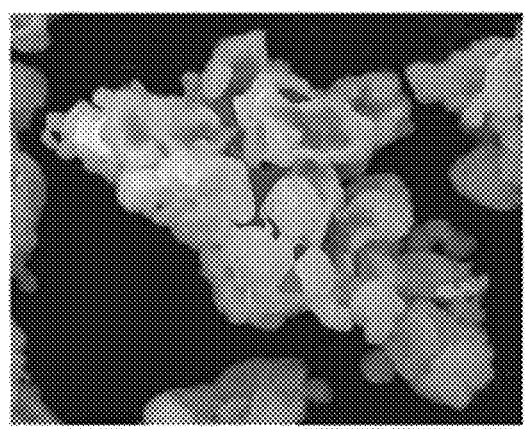
FIGS. 3A and 3B are scanning electron microscopy-energy dispersive X-ray spectrometer (SEM-EDS) images showing observation results of the lithium molybdate composite of the positive active material manufactured according to Preparation Example 1.
Figure 3B:
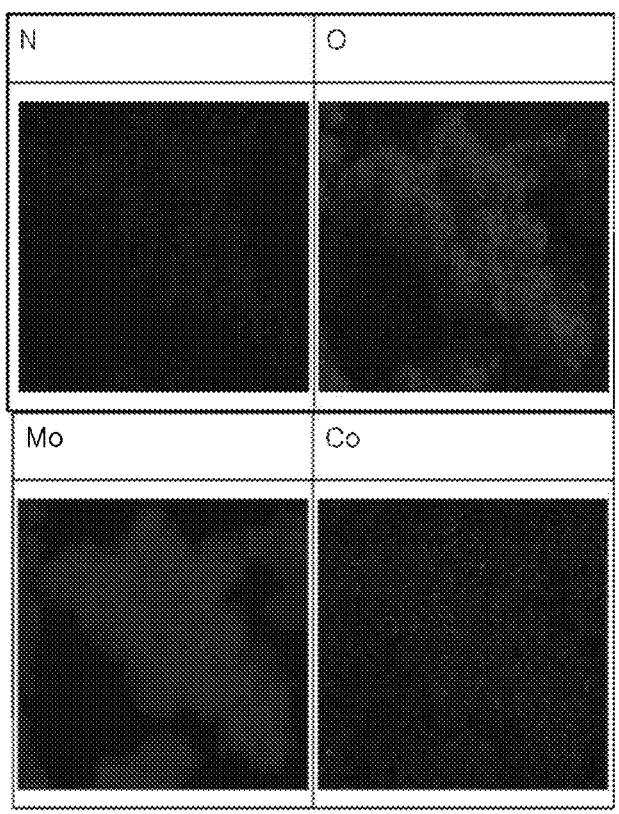

FIGS. 3A and 3B are SEM-EDS images showing observation results of the lithium molybdate composite of Preparation Example 1. Referring to FIGS. 3A and 3B, it was confirmed that the Co components were uniformly distributed on a surface of the lithium molybdate composite. Regarding to the N components, it was confirmed that N atoms were flowed into particles of the lithium molybdate composite in a reducing atmosphere, or the N atoms may be derived from those present in a Co-coating material.

Evaluation Example 2: X-Ray Diffraction Analysis

In order to observe crystalline phases of the lithium molybdates of Preparation Examples 1 and 2 and Comparative Examples 1, X-ray diffraction patterns were measured therefrom using a CuKα ray. The results were shown in FIG. 4A.

Figure 4A:
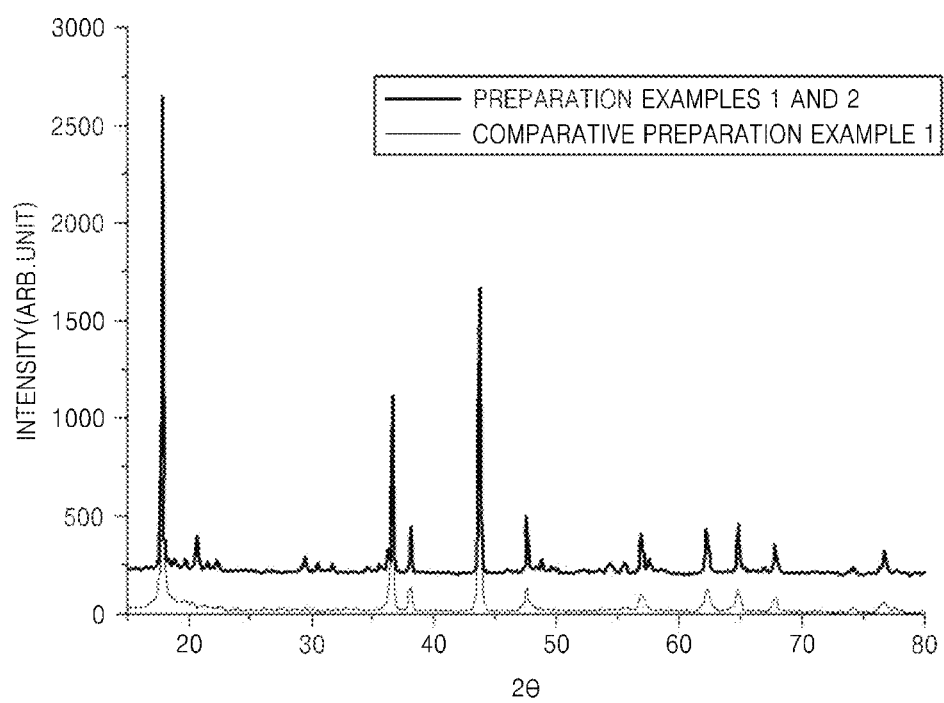
FIG. 4A is a graph showing the results measured by X-ray diffraction patterns using a CuKα ray with respect to lithium molybdate composites of positive active materials manufactured according to Preparation Examples 1-2 and Comparative Examples 1-2.

Referring to FIG. 4A, it was confirmed that the lithium molybdate composites of Preparation Examples 1 and 2 had peaks observed at a diffraction angle (2θ) from 19° to 35°, whereas the lithium molybdate composite of Comparative Preparation Example 1 did not have peaks observed at a diffraction angle (2θ) from 19° to 35°. Thus, it is considered that the peaks observed at the diffraction angle 2θ of the ranges above are expected to exist only in a composite having a core-shell structure.

Figure 4B:
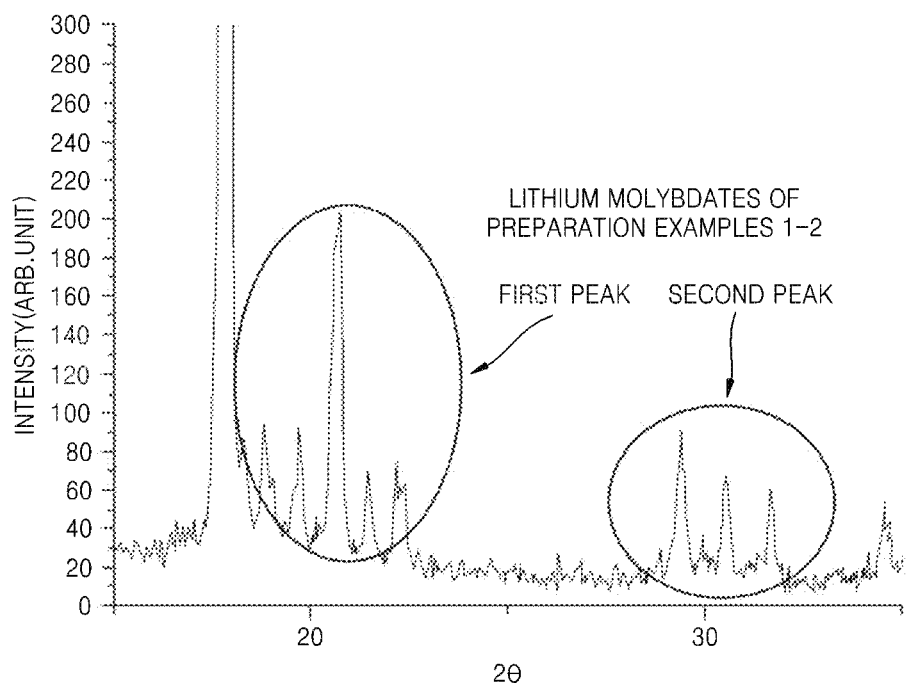
FIG. 4B is a graph showing an enlarged view of peaks at a diffraction angle (2θ) ranging from about 19° to about 35°.

The peaks of the lithium molybdate composites of the Preparation Examples 1 and 2 observed at a diffraction angle 2θ from 19° to 35° in FIG. 4A were enlarged and shown in FIG. 4B. Referring to FIG. 4B, the lithium molybdate composites of Preparation Examples 1 to 3 had a first peak at a diffraction angle 2θ of 20.65±0.1° and a second peak at a diffraction angle 2θ of 30.50±0.1°. Here, the second peak refers to a middle peak among 3 peaks observed at a diffraction angle 2θ of around 30° in FIG. 4B.

Evaluation Example 3: Tem-Eds Analysis

Figure 5A:
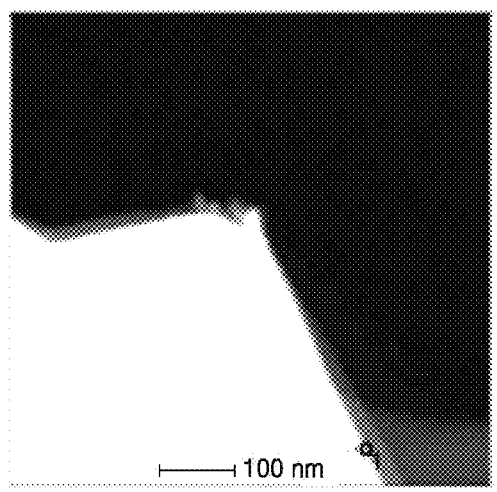
FIGS. 5A and 5B show the results of transmission electron microscopy-bulk energy dispersive X-ray spectrometer (TEM-bulk EDS) with respect to a shell portion of the lithium molybdate composite of the positive material manufactured according to Preparation Example 1.
Figure 5B:
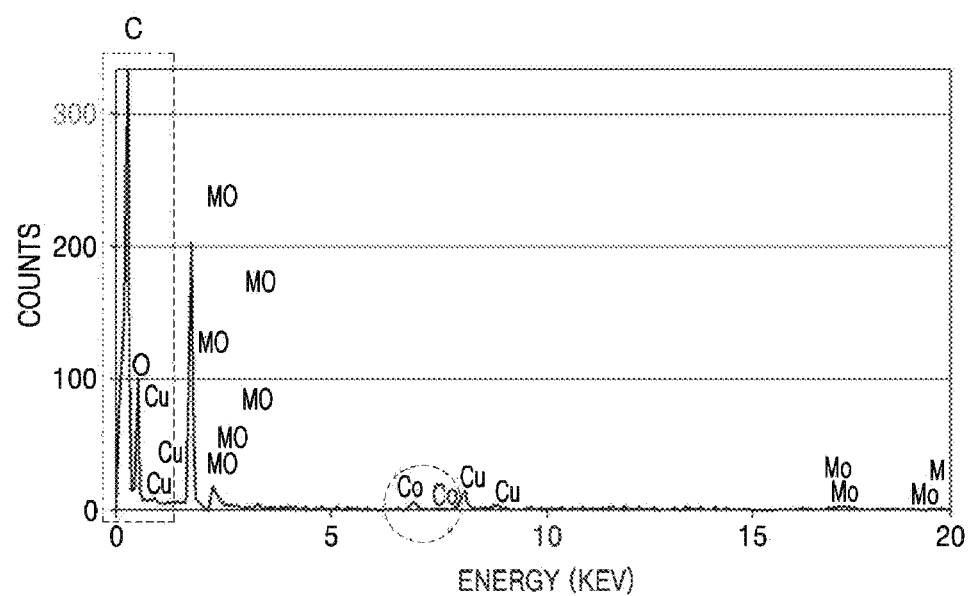

Regarding the shell portion of the lithium molybdate composite of Preparation Example 1, the results of TEM-bulk EDS analysis were shown in FIG. 5. Referring to FIG. 5, it was deemed that the shell portion of the lithium molybdate composite had an amorphous layer mainly comprising carbon and partially comprising Co component.

Figure 6:
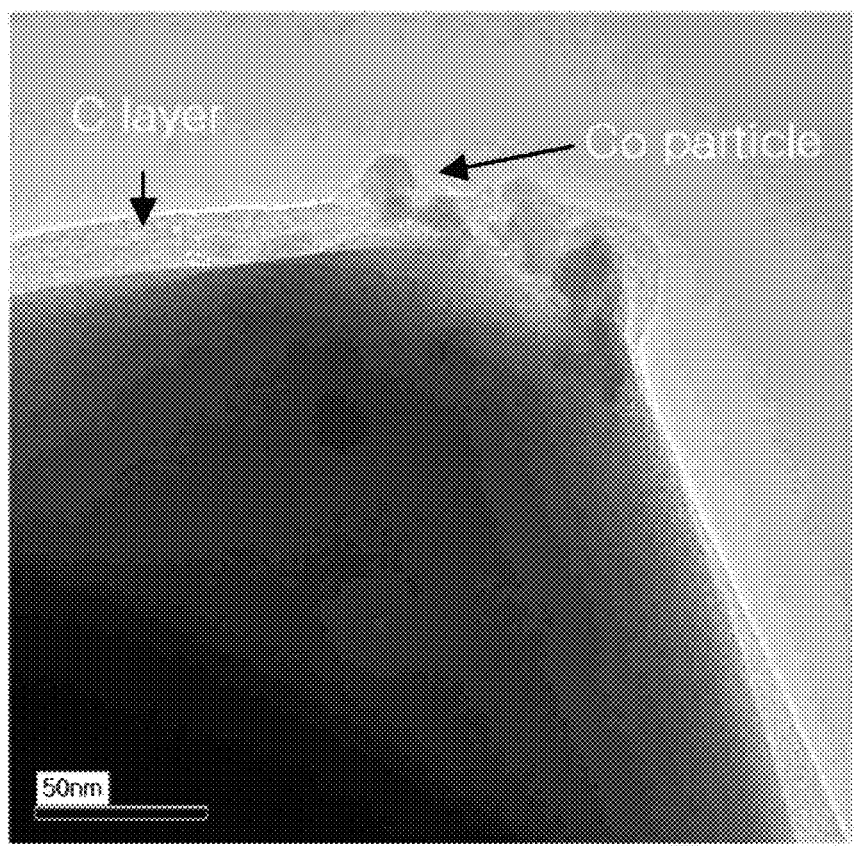
FIG. 6 is a TEM image showing an enlarged view of a shell portion of the lithium molybdate of the positive material manufactured according to Preparation Example 1.

An enlarged TEM image of the shell portion of the lithium molybdate composite in FIG. 5 was shown in FIG. 6. Referring to FIG. 6, as a result of analysis of the surface components, it was confirmed that Co particles were slightly distributed on the surface, and the amorphous coating layer was formed to have a thickness of about 10 nm.

Evaluation Example 4: Nanosims Analysis

Figure 7:
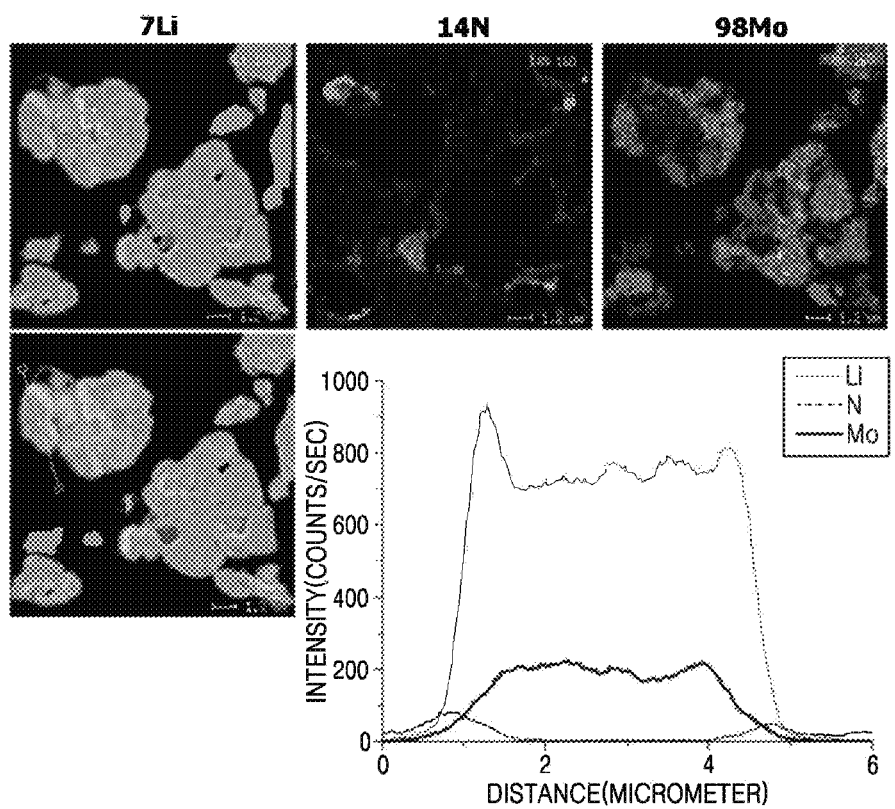
FIG. 7 shows the results of nano secondary ion mass spectrometry (NanoSIMS) analysis with respect to the lithium molybdate composite of the positive material manufactured according to Preparation Example 1.

In order to confirm a distribution zone of the Li-rich phase contained in the lithium molybdate composite of Preparation Example 1, nano secondary ion mass spectrometry (Nano-SIMS) analysis was performed on the lithium molybdate composite having a core-shell structure that contains the LI-rich phase that was obtained before adding $Co(NO_3)_2$ thereto. The results were shown in FIG. 7. Referring to FIG. 7, a Li-rich area near the surface of the lithium molybdate composite was relatively consistent with a Mo-deficient area on the surface of the lithium molybdate composite. Thus, it is expected that the Li-rich phase was non-uniformly present on the surface and within the bulk of the lithium molybdate composite.

Manufacturing of Lithium Battery

Example 1

$LiCoO_2$ and the lithium molybdate composite of Preparation Example 1 were mixed at a weight ratio of 80:20 so as to prepare a positive active material.

The positive active material, the polyvinylidenefluoride (PVDF), and the carbonaceous conductive agent were mixed at a weight ratio of 96:2:2, and then, the mixture was dispersed in a N-methylpyrrolidone solvent so as to prepare a slurry including the positive active material. An aluminum foil current collector was coated with the slurry to have a thickness of 60 μm, and then, the resultant structure, i.e., a thin coated positive plate, was dried at a temperature of 135° C. for at least 3 hours and pressed to manufacture a positive electrode.

In order to manufacture an electrolyte aqueous solution, a lithium salt such as 1.5M $LiPF_6$ was added thereto to a mixed solvent of ethylene carbonate (EC), ethylmethyl carbonate (EMC), and dimethyl carbonate (DMC) that were mixed at a volume ratio of 3:3:4.

A porous polyethylene (PE) film separator was interposed between the positive electrode and the negative electrode so as to form a battery assembly, and then, the battery assembly was wound and pressed to be placed in a battery case. Subsequently, the electrolyte aqueous solution was injected into the battery case, thereby completing the manufacturing of the lithium battery.

Example 2

A positive active material and a lithium battery were manufactured in the same manner as in Example 1, except that the lithium molybdate composite of Preparation Example 2 was used instead of the lithium molybdate composite of Preparation Example 1 when manufacturing the positive electrode.

Comparative Example 1

A positive active material and a lithium battery were manufactured in the same manner as in Example 1, except that the $Li_{2.00}MoO_3$ active material powder of Comparative Preparation Example 1 was used instead of the lithium molybdate composite of Preparation Example 1 when manufacturing the positive electrode.

Comparative Example 2

A positive active material and a lithium battery were manufactured in the same manner as in Example 1, except that $LiCoO_2$ was used alone when manufacturing the positive electrode.

Evaluation Example 5: Measurement of Charge Capacity

The lithium batteries of Examples 1-2 and Comparative Examples 1-2 were charged by flowing a constant current at 8 mA per 1 g of the positive active material (at 0.05 C rate) until the voltages of the lithium batteries reached 4.40 V (vs. Li), and then, the constant current was cut-off. The results of charge capacity measurement during the first cycle of the lithium batteries of Examples 1-2 and Comparative Examples 1-2 were shown in FIG. 8.

Figure 8:
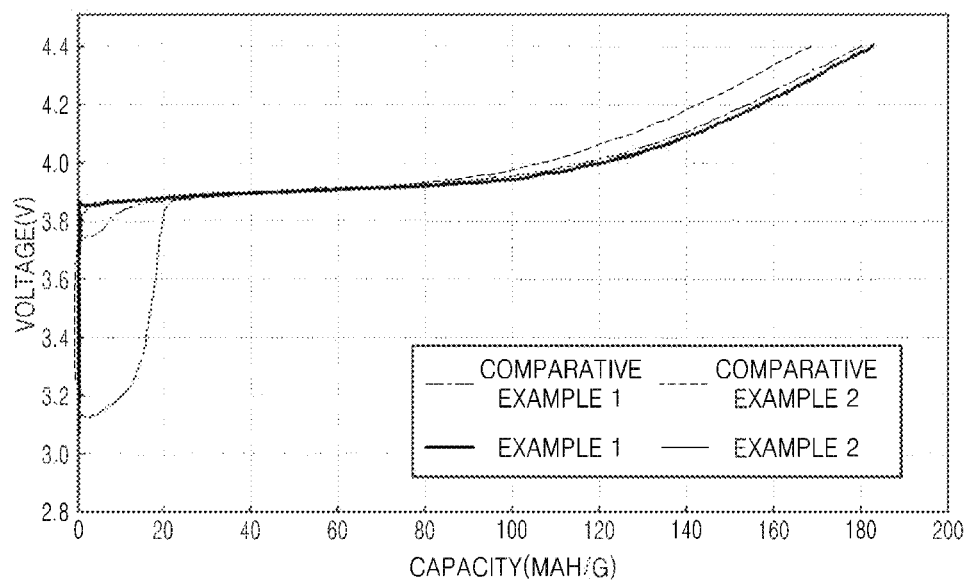
FIG. 8 is a graph showing the results of charge capacity measurement with respect to lithium batteries manufactured according to Preparation Examples 1-2 and Comparative Examples 1-2.

Referring to FIG. 8, it was confirmed that the lithium batteries of Examples 1-2 have increased charge capacities compared to those of the lithium batteries of Comparative Examples 1-2.

Evaluation Example 6: Measurement of Lifetime Property

The lithium batteries of Examples 1-2 and Comparative Examples 1-2 were charged by flowing a constant current at 8 mA per 1 g of the positive active material (at 0.05 C rate) until the voltages of the lithium batteries reached 4.0 V (vs. Li), and then discharged at the same current flow rate as that of the charging until the voltages reached 2.0 V (vs. Li). Subsequently, the charging and discharging of the lithium batteries were repeated 200 times at the same current and voltage intervals. The charging and discharging of the lithium batteries were performed at a temperature of 45° C. Here, the discharge capacity retention of the lithium batteries is defined by Equation 1 below:

Discharge capacity retention ratio [%]=[discharge capacity at $200^{th}$ cycle/discharge capacity at $1^{st}$ cycle]×100     Equation 1

Figure 9:
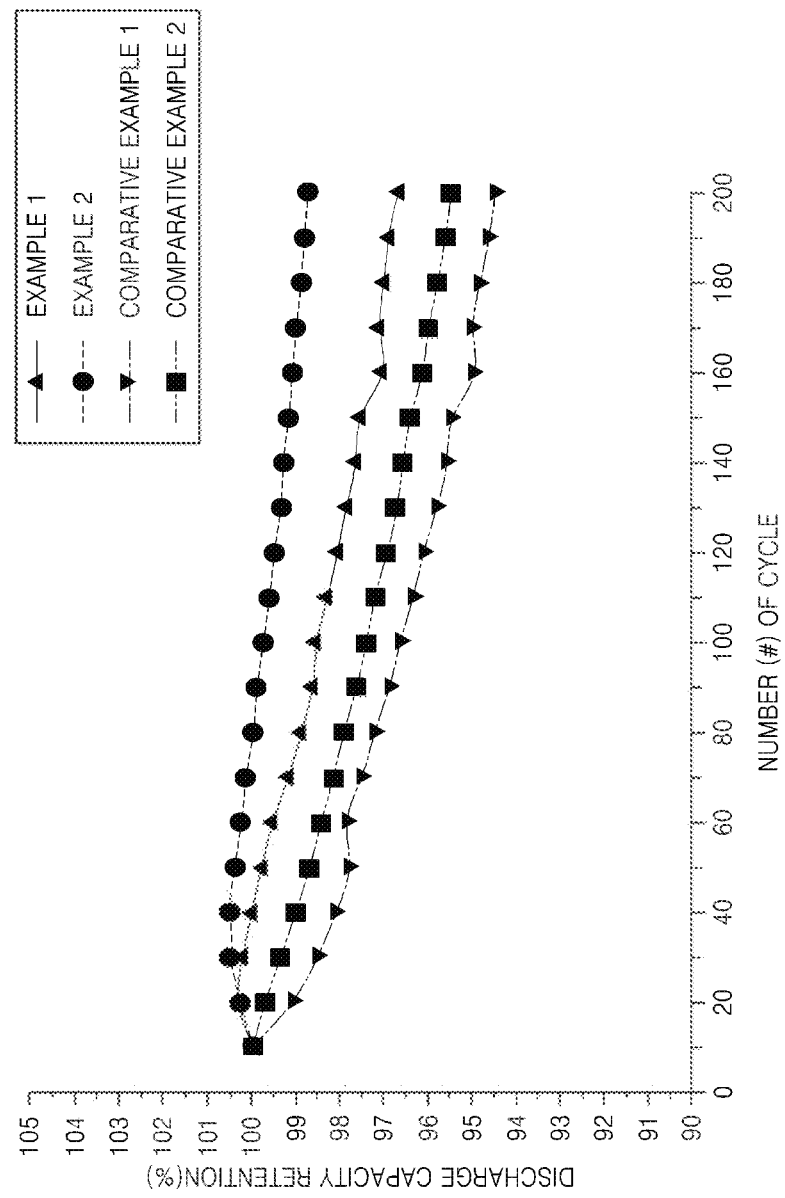
FIG. 9 is a graph showing the results of discharge capacity retention of the lithium batteries manufactured according to Preparation Examples 1-2 and Comparative Examples 1-2.

The results of the discharge capacity retention ratio of the lithium batteries of Examples 1-2 and Comparative Examples 1-2 were shown in FIG. 9.

Referring to FIG. 9, it was confirmed that the lithium batteries of Examples 1-2 have improved lifetime properties compared to the lithium batteries of Comparative Examples 1-2.

As described above, according to the one or more of the above embodiments, a positive active material is able to increase charge capacity of a lithium battery, and accordingly is able to improve lifetime property of a lithium battery.

It should be understood that the example embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A positive active material comprising:
a lithium molybdate composite having a core-shell structure,
wherein the core comprises lithium molybdate having a first peak at a X-ray diffraction angle 2θ of 20.65±0.1° and a second peak at 2θ of 30.50±0.1°, in an X-ray diffraction (XRD) measurement using a CuKα ray, and the shell is an amorphous coating layer consisting of Li, O, C and M, wherein M is at least one selected from sodium (Na), potassium (K), cesium (Cs), magnesium (Mg), calcium (Ca), strontium (Sr), barium (Ba), yttrium (Y), lanthanum (La), titanium (Ti), zirconium (Zr), vanadium (V), manganese (Mn), iron (Fe), cobalt (Co), nickel (Ni), silver (Ag), gold (Au), zinc (Zn), and aluminum (Al).

2. The positive active material of claim 1, wherein the lithium molybdate comprises an oxide comprising Li—Mo—O having a crystalline structure.

3. The positive active material of claim 2, wherein the oxide comprising Li—Mo—O is a positive active material represented by Formula 1 below:

$$Li_xMo_yO_z \quad \text{[Formula 1]}$$

wherein 0≤x≤6, 1≤y≤5, and 2≤z≤17.

4. The positive active material of claim 2, wherein the oxide comprising Li—Mo—O is a positive active material selected from $Li_2MoO_3$, disordered $Li_2MoO_3$, $Li_4MoO_5$, $Li_{0.98}MoO_2$, or a combination thereof.

5. The positive active material of claim 1, wherein a full width at half maximum of the first peak (FWHM1) is from about 0.05° to about 2°, and a full width at half maximum of the second peak (FWHM2) is from about 0.05° to about 1°.

6. The positive active material of claim 1, wherein the lithium molybdate further has a third peak at 2θ of 17.90±0.1° in X-ray diffraction analysis, and the peak intensity ratio of the first peak and the third peak ($I_1/I_3$) is from about 0.01 to about 0.1.

7. The positive active material of claim 1, wherein the amorphous coating layer contains lithium in a larger amount than that of lithium contained in the core.

8. The positive active material of claim 7, wherein the amount of the lithium contained in the amorphous coating layer is from about 1.0025 mol to about 1.15 mol based on 1 mol of the lithium molybdate comprised in the core.

9. The positive active material of claim 1, further comprising a nitrogen-comprising lithium molybdate intermediate layer between the core and the outer shell.

10. The positive active material of claim 1, wherein the lithium molybdate composite acts as a sacrificial positive electrode.

11. The positive active material of claim 1, further comprising a lithium transition metal oxide composite.

12. The positive active material of claim 11, wherein the lithium transition metal oxide composite is at least one selected from $LiCoO_2$, $LiNiO_2$, $LiMnO_2$, $LiMn_2O_4$, $Li(Ni_aCo_bMn_c)O_2$ (wherein 0<a<1, 0<b<1, 0<c<1, and a+b+c=1), $LiNi_{1-Y}Co_YO_2$, $LiCo_{1-Y}Mn_YO_2$, $LiNi_{1-Y}Mn_YO_2$ (wherein 0≤Y≤1), $Li(Ni_aCo_bMn_c)O_4$ (wherein 0<a<2, 0<b<2, 0<c<2, and a+b+c=2), $LiMn_{2-z}Ni_zO_4$, $LiMn_{2-z}Co_zO_4$ (wherein 0<Z<2), $LiCoPO_4$, $LiFePO_4$, $LiFePO_4$, $V_2O_5$, TiS, and MoS.

13. The positive active material of claim 11, wherein a weight ratio of the lithium transition metal oxide composite to the lithium molybdate composite is from about 50:50 to about 99:1.

14. A lithium battery comprising:
a positive electrode;
a negative electrode disposed opposite to the positive electrode; and
an electrolyte interposed between the positive electrode and the negative electrode;
wherein the positive electrode comprises a positive active material comprising a lithium molybdate composite having a core-shell structure, the core comprises lithium molybdate having a first peak at a X-ray diffraction angle 2θ of 20.65±0.1° and a second peak at 2θ of 30.50±0.1°, in an X-ray diffraction (XRD) measurement using a CuKα ray, and the shell is an amorphous coating layer consisting of Li, O, C and M, wherein M is at least one selected from sodium (Na), potassium (K), cesium (Cs), magnesium (Mg), calcium (Ca), strontium (Sr), barium (Ba), yttrium (Y), lanthanum (La), titanium (Ti), zirconium (Zr), vanadium (V), manganese (Mn), iron (Fe), cobalt (Co), nickel (Ni), silver (Ag), gold (Au), zinc (Zn), and aluminum (Al).

15. The lithium battery of claim 14, wherein the lithium molybdate comprises an oxide comprising Li—Mo—O having a crystalline structure.

16. The lithium battery of claim 14, wherein the lithium molybdate composite acts as a sacrificial positive electrode.

17. The lithium battery of claim 14, wherein the negative electrode is selected from Si, $SiO_x$ (wherein $0 \leq x \leq 2$), a Si—Y alloy (wherein Y is an alkali metal, an alkali earth metal, a Group 13 element, a Group 14 element, a transition metal, a rare-earth element, or a combination element thereof, and Y is not Si).

* * * * *